US011301165B2

(12) United States Patent
Gooding et al.

(10) Patent No.: US 11,301,165 B2
(45) Date of Patent: Apr. 12, 2022

(54) ACCELERATING SHARED FILE CHECKPOINT WITH LOCAL BURST BUFFERS

(71) Applicant: International Business Machines Corporation, Armonk, NY (US)

(72) Inventors: Thomas Gooding, Rochester, MN (US); Pierre Lemarinier, Leixlip (IE); Bryan S. Rosenburg, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 15/963,700

(22) Filed: Apr. 26, 2018

(65) Prior Publication Data

US 2019/0332318 A1 Oct. 31, 2019

(51) Int. Cl.
*G06F 3/06* (2006.01)
*G06F 16/18* (2019.01)

(52) U.S. Cl.
CPC ............ *G06F 3/0659* (2013.01); *G06F 3/067* (2013.01); *G06F 3/0611* (2013.01); *G06F 3/0643* (2013.01); *G06F 3/0644* (2013.01); *G06F 3/0656* (2013.01); *G06F 16/1858* (2019.01)

(58) Field of Classification Search
CPC .... G06F 3/0659; G06F 16/13; G06F 16/1858; G06F 3/0611; G06F 3/0643; G06F 3/0656; G06F 3/067; G06F 3/0644
See application file for complete search history.

(56) References Cited

U.S. PATENT DOCUMENTS

| 8,972,465 | B1 | | 3/2015 | Faibish et al. |
| 9,286,261 | B1 | * | 3/2016 | Tzelnic ................. G06F 11/108 |
| 9,477,551 | B1 | | 10/2016 | Piszczek et al. |
| 9,477,682 | B1 | | 10/2016 | Bent et al. |
| 10,049,122 | B1 | * | 8/2018 | Faibish ................. G06F 16/188 |
| 10,558,618 | B1 | * | 2/2020 | Bent ....................... G06F 16/13 |

(Continued)

OTHER PUBLICATIONS

Bent et al., "PLFS: A Checkpoint Filesystem for Parallel Applications", 2009 Association for Computing Machinery, SC09 Nov. 14-20, 2009, Portland, Oregon.

(Continued)

*Primary Examiner* — Amresh Singh
(74) *Attorney, Agent, or Firm* — Scully, Scott, Murphy & Presser, PC 2; Daniel P. Morris, Esq.

(57) ABSTRACT

A data management system and method for accelerating shared file checkpointing. Written application data is aggregated in an application data file created in a local burst buffer memory at a compute node, and an associated data mapping built index to maintain information related to the offsets into a shared file at which segments of the application data is to be stored in a parallel file system, and where in the buffer those segments are located. The node asynchronously transfers a data file containing the application data and the associated data mapping index to a file server for shared file storage. The data management system and method further accelerates shared file checkpointing in which a shared file, together with a map file that specifies how the shared file is to be distributed, is asynchronously transferred to local burst buffer memories at the nodes to accelerate reading of the shared file.

15 Claims, 11 Drawing Sheets

(56) References Cited

U.S. PATENT DOCUMENTS

2014/0337557 A1     11/2014   Nowoczynski et al.
2014/0351300 A1*    11/2014   Uppu .................. H04L 12/6418
                                                                707/827
2015/0134780 A1      5/2015   Weber et al.

OTHER PUBLICATIONS

Fang et al., "How Much SSD Is Useful for Resilience in Supercomputers", Fault Tolerance at Extreme Scale (FIXS) at HPDC 2015, Portland, Oregon, Jun. 15, 2015.

Kimpe et al., "Integrated In-System Storage Architecture for High Performance Computing", Proceedings of the 2nd International Workshop on Runtime and Operating Systems for Supercomputers, Article 4; Venice, Italy, Jun. 29, 2012.

Sato et al., "A User-level InfiniBand-based File System and Checkpoint Strategy for Burst Buffers", 2014 14th IEEE/ACM International Symposium on Cluster, Cloud and Grid Computing, Chicago, IL, May 26-29, 2014, pp. 21-30.

Wang et al., "BurstMem: A High-Performance Burst Buffer System for Scientific Applications", 2014 IEEE International Conference on Big Data, Washington, DC, Oct. 27-30, 2014, pp. 71-79.

\* cited by examiner

ACCELERATING SHARED FILE CHECKPOINT WITH LOCAL BURST BUFFERS

STATEMENT REGARDING FEDERALLY SPONSORED RESEARCH OR DEVELOPMENT

This invention was made with government support under CORAL NRE B604142 awarded by the Department of Energy. The government has certain rights to this invention.

FIELD

The present disclosure relates generally to high performance computing systems implementing checkpointing for parallel applications, and more particularly, to a data management system on computing nodes and a novel system for accelerating copying of written application data files to a burst buffer infrastructure on compute nodes and asynchronously transferring an associated data index and application data files to the parallel file system.

BACKGROUND

Large scale clusters (such as large supercomputers) have many parts that, in aggregate, will experience regular hardware failures. These systems of this scale are challenging to build, and often have a target MTBF in the range of 1-3 days. Unfortunately, parallel compute models, like message passing interface (MPI) found in High Performance Computing (HPC) systems, tend to require all components to be functional in order to achieve forward progress of the computation. These compute models tend to rely on checkpoint techniques in order to tolerate hardware failures. (e.g., redo an hour of computation vs. 7 days of computation)

An MPI job comprises many processes (also called tasks) spread across many different compute nodes. Each compute node can have multiple MPI processes running. The processes will communicate amongst themselves via a fast, low latency network, like InfiniBand®. There are typically alternating computation and communication phases. Checkpoints are typically performed between phases, after a desired length of time has elapsed. The compute nodes will also use a network-attached parallel file system to retrieve/store permanent data on high-density storage (currently spinning magnetic disks).

Currently, there are two main checkpointing techniques: 1) Every process on a compute node dumps its local data into a unique checkpoint file that it will restart from if failures happen; 2) Every process writes into a single file shared among all processes. They can then restart by retrieving their portion of data from this shared file.

As known, a current HPC system implementation includes the provision of burst buffers, which are non-volatile memories interposed between computing nodes and a parallel file system. Burst Buffers are used to accelerate checkpoint creation and restoration and reduce the amount of time the applications are checkpointing (or said differently: increase the amount of time the applications are performing useful science rather than performing I/O).

Their higher bandwidth and I/O operations per Second (iops) can accelerate I/O operations compared to classic file systems, but their limited capacity prohibit their use as a replacement for traditional parallel file system.

The main usage for burst buffers is to accelerate application checkpoints: processes will write their local checkpoint files into the burst buffer, and the overall system will provide an asynchronous mechanism for copying files from the burst buffer into the parallel file system. The Oak Ridge National Laboratory's Summit FAQ describes the burst buffer this way:

"The burst buffer is an intermediate, high-speed layer of storage that is positioned between the application and the parallel file system (PFS), absorbing the bulk data produced by the application at a rate a hundred times higher than the PFS, while seamlessly draining the data to the PFS in the background. Consequently, the burst buffer will be able to expedite the rate of I/O, allowing the application to return to performing computation sooner. The burst buffer is built from non-volatile memory devices that have several desirable properties such as high I/O throughput, low access latency, and higher reliability."

In some incarnations, the burst buffer is a single appliance managing all the non-volatile memories and providing a full parallel file system interface, interposed between the compute nodes and the actual parallel file system. In other incarnations, the burst buffer is comprised of individual non-volatile memories distributed among the compute nodes. Each non-volatile memory is attached to a single compute node or to a small subset of compute nodes. With the latter organization, there is typically no single parallel file system interface to the burst buffer as a whole, and instead each non-volatile memory is managed as a separate file system local to a single compute node (or small group of nodes).

The latter burst-buffer organization enables accelerating checkpoints consisting of node-local checkpoint files, however, it is not conducive to accelerating shared-file checkpointing, in which every application process writes into a single file shared among all computing nodes.

SUMMARY

According to at least one embodiment of the present invention there is provided a solution for accelerating shared-file checkpointing for computing nodes of an HPC to enable shared-file checkpointing using local files that contain partial information about the single shared file.

In one aspect of the present invention, there is provided a system for managing storage of data. The system comprises: a plurality of compute nodes of a computing system, each node running an application that generates application data for storage to a shared file stored in a shared parallel file system (PFS); each compute node further comprising a burst memory storage device local to the compute node; each compute node including a processor and an associated memory for storing data and instructions, the processor running the instructions to configure the processor to: respond to write operations issued by the running application by storing segments of application data to the associated memory; open a single data file corresponding to the running application in the burst memory storage device local to the compute node; store the written segments of application data from the associated memory to the single file in the burst memory storage device; build an associated index for the single file comprising data specifying locations within the shared file for storing the segments of application data written to the single data file; and transfer the single data file and the associated index from the burst memory storage device at the compute node to the PFS for storage thereat, the parallel file system generating the shared file and storing segments of application data from the single data file to the shared file in the PFS at the locations specified in the associated index.

According to a further aspect, there is provided a method for managing storage of data in a system comprising a plurality of compute nodes, each node running an application that generates application data for storage to a shared file stored in a shared parallel file system (PFS); each compute node further comprising a burst memory storage device local to the compute node, the method comprising: storing segments of application data, by a hardware processor, in response to write operations issued by the running application, to a memory associated with the hardware processor; opening, by the hardware processor, a single data file corresponding to the running application in the burst memory storage device local to the compute node; storing, by the hardware processor, the segments of written application data from the associated memory to the single file in the burst memory storage device; building, by the hardware processor, an associated index for the single file comprising data specifying locations within the shared file for storing the segments of application data written to the single data file; and transferring the single data file and the associated index from the burst memory storage device at the compute node to the PFS for storage thereat, the parallel file system generating the shared file and storing the segments of application data from the single data file to the shared file in the PFS at the locations specified in the associated index.

In yet a further aspect, there is provided a system for managing storage of data in a shared parallel file system (PFS). The system comprises: a plurality of I/O nodes each for interfacing directly with said PFS and computing nodes configured to store written application data to a shared file stored in said PFS, each I/O node having a processor and associated memory storing data and instructions, said instructions configuring said processor to: receive transferred segments of written application data for storage in a shared file at said PFS; and receive an index associated with said transferred segments of written application data, said index comprising data specifying locations within said shared file for storing said transferred segments; store the segments of written application data into said shared file at locations specified by the associated index; receive a command to stage a transfer plurality of segments of said shared file to a burst memory storage device associated with one or more compute nodes for reading thereat; assemble, responsive to said received command, a package comprising said segments stored and an associated index characterizing said segments; push said package back to said one or more compute nodes for storage at an associated local burst memory storage device.

Embodiments of the invention will be described in more detail below, by way of illustrative and non-limiting example, with reference to the accompanying drawings.

DETAILED DESCRIPTION

Figure 1:
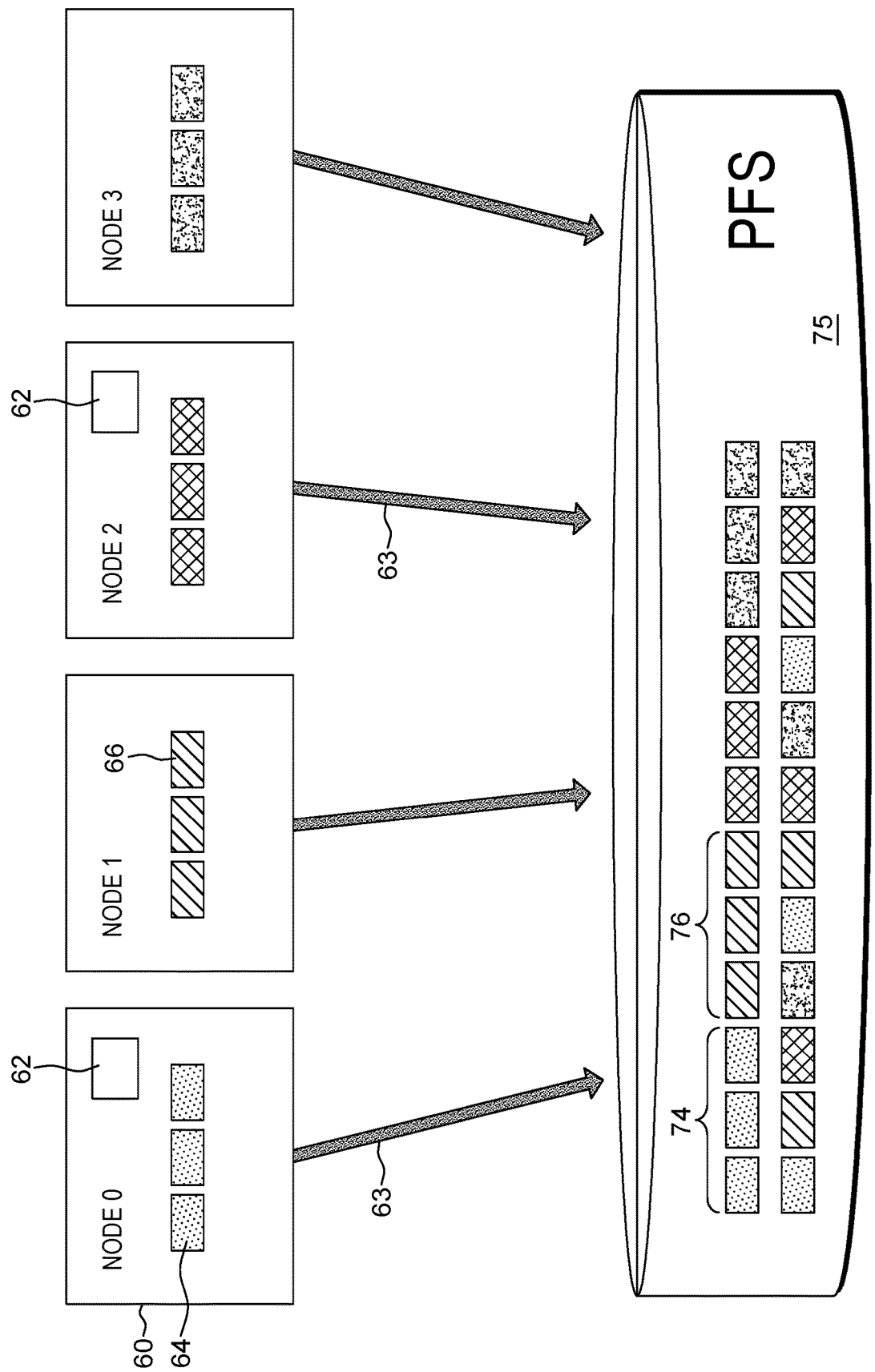
FIG. 1 depicts a typical shared checkpoint application upon which the present invention improves.

FIG. 1 depicts a typical shared checkpoint application 60 upon which the present invention improves. As shown in FIG. 1, plural nodes 61 of an HPC system are depicted writing respective application data 64 (e.g., checkpoint data) to a parallel shared file 75. When every application process 62 opens the same file, it implements a write process 63 to write its own elements into its dedicated file region, e.g., Node 0 writes its application data 64 into file region 74, Node 1 writes its application data 66 into a file region 76 offset from a reference data file location in the shared file, etc. It is assumed that no two processes write the same offset in the shared file: each process 62 writes to a separated region of the shared file 75, thus no coherency mechanism at the file level between nodes is required and the compliance to a portable operating system interface (POSIX®) can be relaxed.

In one embodiment, the present invention improves upon the system of FIG. 1, by enabling the acceleration of such I/O type of pattern using a file system that performs tracking of each write operation and its targeted shared file offset, in order to replay these operations when copying into the parallel file system (PFS) 75, e.g., a network-attached parallel file system, to retrieve/store permanent data on high-density storage devices. The acceleration reduces the time to write such a file thereby increasing the efficiency of the computing machine by increasing the amount of time available for computing operations.

Figure 2:
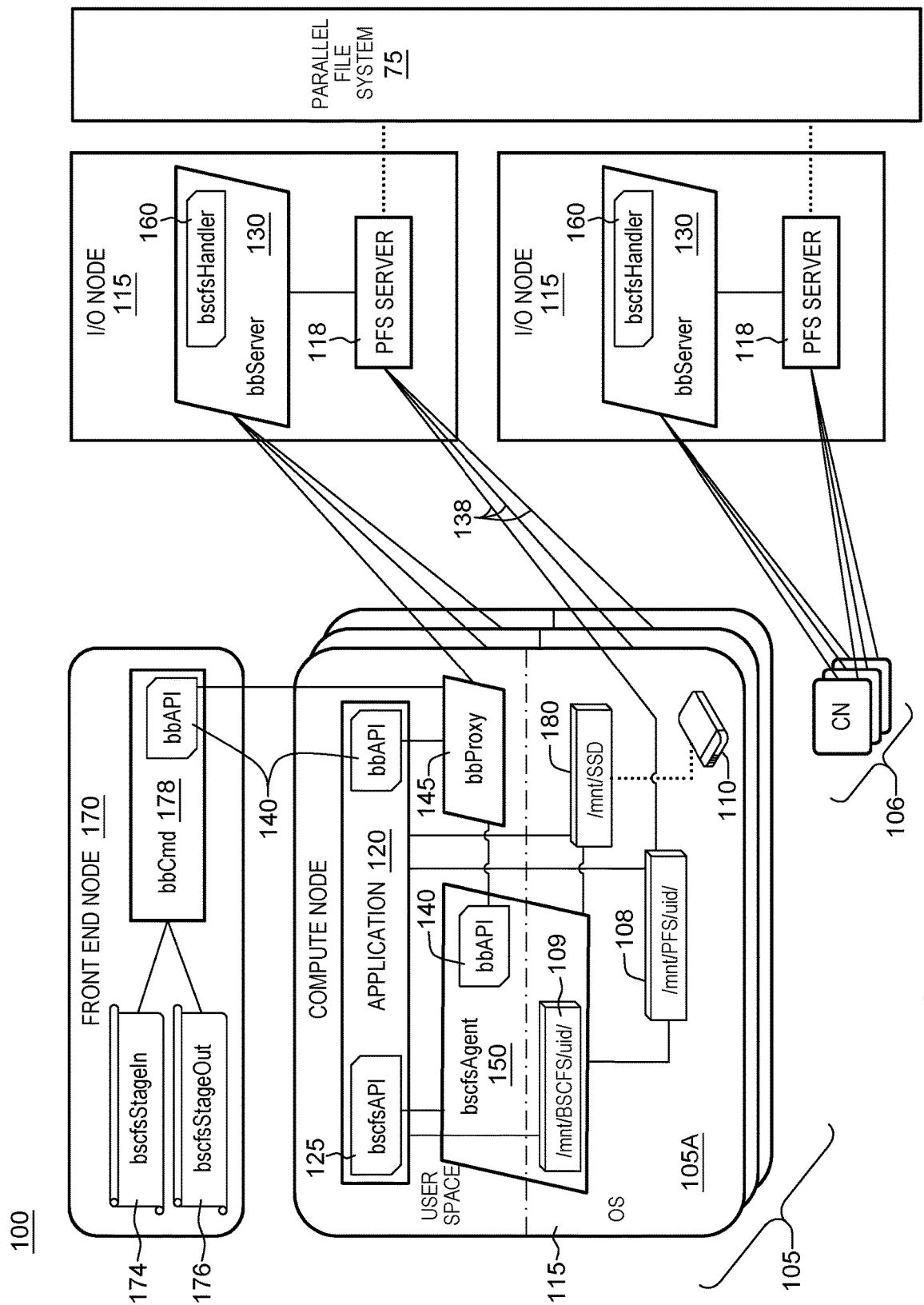
FIG. 2 is a detailed depiction of a logging file system for node-local storage tiers to create shared files in one embodiment.

FIG. 2 is a detailed depiction of a logging file system 100 for node-local storage tiers to create shared files. The resulting logging file system 100 provides elements for accelerating shared file checkpointing in an HPC system. The system 100 provides an efficient implementation of a tiered storage hierarchy and includes local burst buffers and a parallel shared file (PFS) system 75 to support both large shared files and checkpoint/restart.

Figure 3:
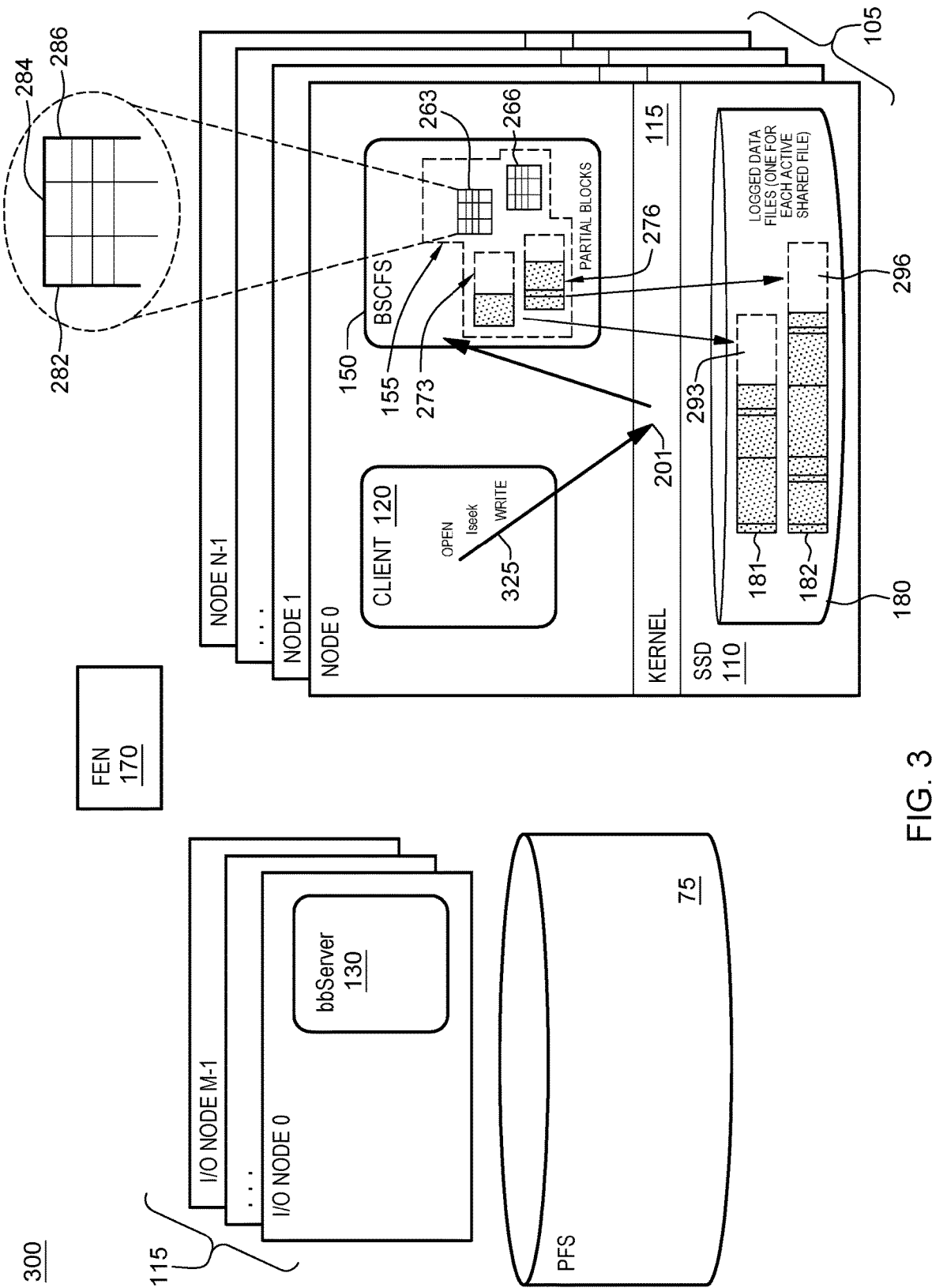
FIG. 3 depicts the shared file checkpointing system of FIG. 2 configured for shared-file writing functionality in one embodiment.

In particular, FIG. 2 shows a shared file checkpointing system 100 having a plurality of computing nodes 105, 106 each running same or similar application in parallel and configured for high performance computing. For illustrative purposes, as shown in FIG. 3, there may be N compute nodes 105 labeled Node 0, Node 1, . . . , Node N−2, Node N−1. Additionally, system 100 includes shared file servers, also referred to herein as I/O nodes 115. For illustrative purposes, as shown in FIG. 3, there may be M I/O nodes 115 labeled I/O Node 0, . . . , I/O Node M−1. Each compute node 105 communicates with a parallel file system (PFS) 75, e.g., a database through one of the I/O nodes 115. In one embodiment, each compute node, e.g., node 105A, includes a client application 120 performing burst buffer memory reading and writing storage operations local to the node and that further communicates with an external server application, e.g., bbServer component 130 running on a corresponding I/O node 115, and interfacing the parallel file system 75 via PFS server application 118 that supports parallel shared file operations.

In one embodiment, the client application 120 at the compute node may be a checkpointing application for generating checkpointing data for shared file storage in the PFS 75. One component of the application 120 includes an application programming interface, e.g., a burstbuffer API (bbAPI) component 140 that enables various communications among other software components. For example, the bbAPI 140 communicates with a bbProxy application component 145 which, in combination with the bbServer application 130 at the I/O node 115, provides the infrastructure to copy files asynchronously between the local burst buffer memory 110 at the compute node and the PFS 75. In one embodiment, the burst buffer memory 110 is local to each compute node 105A and may comprise (but is not limited to) a 1-2 TB solid state drive (SSD), e.g., an internal SSD formatted with a local (Extents File System) XFS format file system 180. There is provided a transport mechanism that moves files between the XFS file system 180 at the burst buffer 110 and the PFS parallel file system 75. In one embodiment, each compute node transmits the data files from the SSD 110 over respective data paths 138 to the I/O node for sharing in the PFS file.

A further application provided at each compute node 105 for the file checkpointing system is a burst buffer shared checkpoint file system Agent (bscfsAgent) application component 150, which provides a file system for keeping track of data and index information in memory and aggregate data in the local burst buffer 110 at the node. In one embodiment, the client application 120 communicates with the bscfsAgent component 150 via a bscfsAPI component 125. In one embodiment, through the bscfsAPI component 125, the application 120 is enabled to initiate a drain operation and tell the bscfsAgent 150 to start draining, e.g., pulling data from local SSD storage to the shared file system. Through the bbAPI 140, the bscfsAgent component 150 communicates with the burst buffer proxy application component 145 to interface with a corresponding burst buffer shared checkpoint file system Handler (bscfsHandler) component 160 configured to read provided index files and data files, and reassemble the shared file for storage at the PFS 75 at an I/O node. The data files to be shared in the PFS received over data paths 138 are processed by the PFS server application 118 under control of the bscfsHandler component 160. The bscfsHandler component 160 additionally handles the assembling of data from the PFS for staging back to the local SSD at a compute node.

As further shown in FIG. 2, at each compute node 105, a local file system 108 is provided for use by the compute node operating system kernel 115 that provides a per node implementation of the PFS file system. This is a local component in the kernel to provide a local view of the PFS file system to that compute node. A second file system 109 is the BSCFS file system that the bscfsAgent 150 is providing to the client. A third file system 180 is the XFS instance formatted in a partition of the burst-buffer SSD device 110, which is the local SSD memory used for working storage, e.g., for storing data files and index files. The SSD file system 180 may also be accessed by the client directly for reading/writing non-BSCFS files.

As further shown in FIG. 2, a front end processing node 170 is provided including a burst buffer shared checkpoint file system StageIn (bscfsStageIn) component 174 and StageOut component 176 which provides respective scripts for scheduling and dispatching operations for burst buffer shared checkpoint file system functionality as will be explained in greater detail herein below. The Stageout component 176 runs a script that will check the status of drain operations to ensure that the draining was successful and/or perform any cleanup operations. The bbCmd component 178 is a command line interface to control the bbProxy 145 and perform transfers, starts, stops, perform queries at the node, etc.

In an embodiment, when an application process 120 writes checkpointing data into this file system 75, the system 100 performs: aggregating the corresponding data segments into a file locally in the burst buffer memory 110; and building an index (i.e., data mapping) to maintain information related to which data segments of data were written, where they are located in the burst buffer 110 and the offsets in the shared file to which they are destined. In one embodiment, all compute nodes 105 copy both the data and index files to the I/O nodes 115, where the original data segments are written to the PFS 75 in order to create the shared file.

FIG. 3 depicts the shared file checkpointing system 300 of FIG. 2 configured for shared-file writing functionality. In FIG. 3, there is shown a plurality of computing nodes 105 running same or similar applications 120 in parallel and configured for high performance computing. While shown at Node 0, each of compute nodes 105 communicate with a parallel file system (PFS) represented as a database 75 through one of the I/O nodes 115. In one embodiment, each compute node client application 120 performs burst buffer reading and writing storage operations local to the node and further communicates with the external bbServer application 130 at a corresponding I/O node interfacing the parallel file system 75. Each compute node 105 further includes operating system kernel processes 115 for managing component operations and communications for running applications at the local node. As shown in FIG. 3, the burst buffer memory 110 may include a local non-volatile random access memory NVRAM or a Solid State Drive (SSD) storage device 110 for data storage. As shown, the local burst buffer memory 110 hosts a file system 180 that stores data files corresponding to active shared files. For example, there are depicted data files 181 and 182 stored in the SSD file system 180 as generated by compute Node 0. The open file being processed corresponds to a shared data file maintained by the PFS system 75.

In one embodiment, to perform shared file writing operations, a compute node's client application process 120 issues function calls 325 to open a file in the local burst buffer memory file system 110 corresponding to a shared file to be stored in the PFS 75. In one embodiment, client application 120 may perform a series of lseek( ) and write( ) system calls 325 on the open file specified by open( ) file call. As known, a write( ) operation takes in parameters including a file descriptor (file name), a buffer location buff and a size of the file, e.g., count in bytes) and attempts to write the count bytes from the location pointed to by the argument buff to the file associated with an open file descriptor. The lseek( ) system function is a call that changes a current file offset to a new position in the opened file. For example, the new position may be a given byte offset from the beginning of the file. After having used lseek( ) to seek to a new location, the next I/O operation on the file begins at that location.

These I/O function calls open( ), lseek( ) and write( ) 325 are received by node operating system kernel 115 and the function calls are "redirected" at 201 to the bscfsAgent process 150 running on the compute node. The bscfsAgent process 150 includes some amount of local node memory 155 in its address space. The bscfsAgent process 150 accumulates content written by the application in buffers ("partial blocks") 273, 276 in local node memory 155, and it writes the buffers to data files 181, 182 in the job's SSD file system 180 when the buffers fill up. For illustrative purposes, FIG. 3 shows two active files with an in-memory partial block and a data file for each. For example, a client application may write data in segments of 16 bytes to one open BSCFS file, and these segments are accumulated in the partial block 273 associated with the open file. When the partial block 273 is full the bscfsAgent process 150 writes it as the next full block 293 of the data file 181 associated with the open BSCFS file. Likewise, FIG. 3 shows the bscfsAgent process 150 managing a second open BSCFS file, with in-memory partial block 276 to be written as the next full data block 296 of data file 182 when the partial block is full.

In one example, the SSD partition or data file is organized according to blocks, e.g., 64 Kbytes each. The local node memory 155 of the compute node 105 is configured to store smaller data segments written by the client application 120. In one embodiment, the smaller data segments written by the application may be aggregated in local memory to provide a larger chunk (e.g., at a minimum of 64 Kbytes) for transfer to the SSD. Thus, once a sufficient number of smaller data segments are stored in a local memory buffer ("partial block") 273 or 276, the bscfsAgent process 150 will store the aggregated written data (e.g., 64 Kbytes worth) in one instance to the data file 181 or 182 in the SSD for storage thereof as a contiguous block.

In one embodiment, the bscfsAgent process 150 generates and maintains a corresponding index in local node memory 155, e.g., indices 263, 266 corresponding to the respective data content written to data files 181, 182, respectively. Such an index maintains the correspondence between data segments accumulated locally (in the in-memory partial block and SSD data file) and the segments' ultimate destinations in the PFS shared file. For example, respective indices 263, 266 are stored in local node memory 155 by the bscfsAgent for tracking each segment of the written data stored in data files 181, 182. As shown in FIG. 3, the bscfsAgent builds an index 263 to include the following information for each data segment written by the client application: 1) the offset 282 of the segment in the local SSD data file; 2) the intended offset 284 of the segment in the shared file that will eventually be created in the PFS; and 3) the size 286 of the segment written by the application. A separate data file and index is maintained for each distinct target file. The index 263 keeps track of the relationship between the local data file stored contiguously in the SSD and the ultimate shared file where the written pieces may not be stored contiguously.

Figure 4:
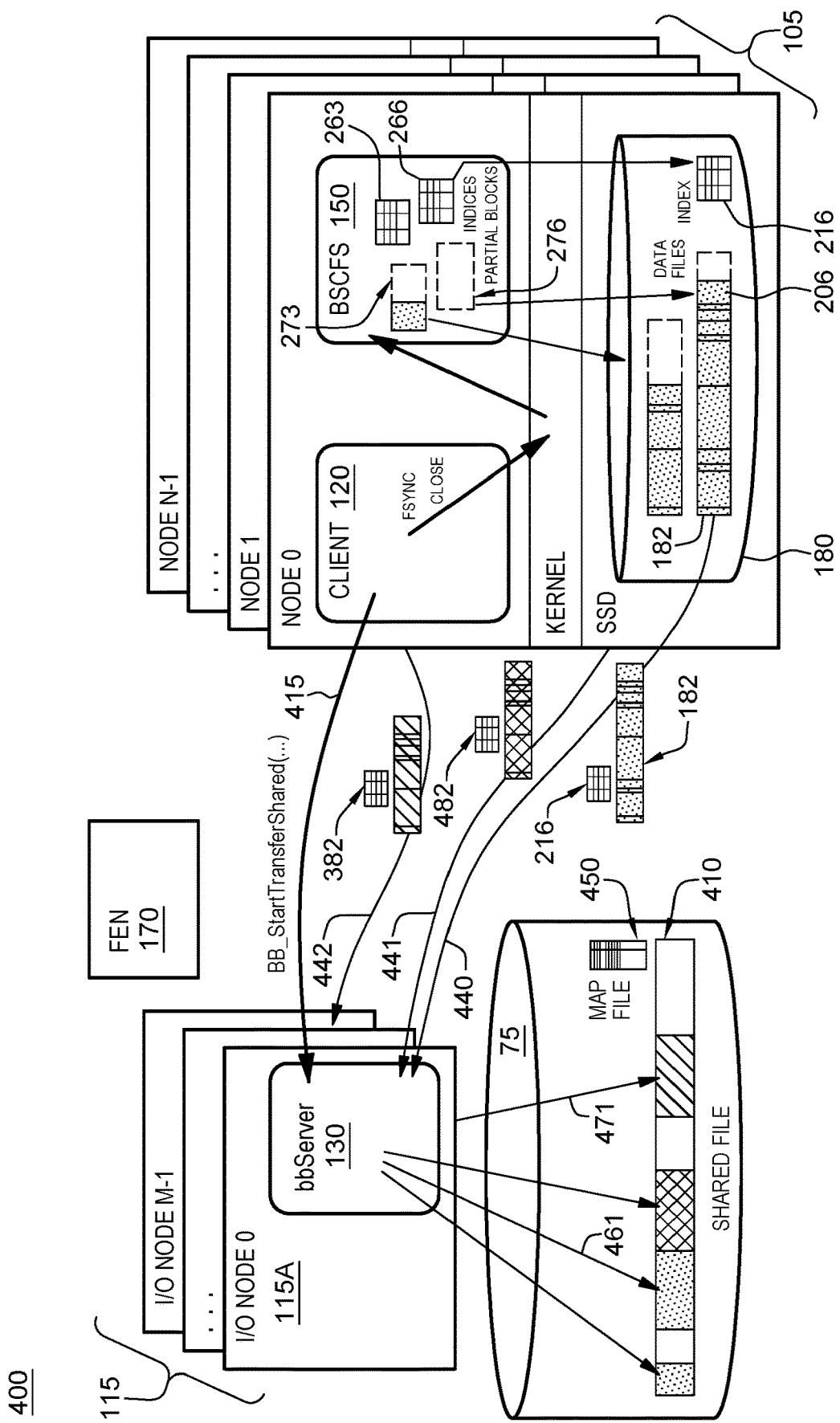
FIG. 4 depicts the shared file checkpointing system of FIG. 2 configured for shared-file draining operations in one embodiment.

FIG. 4 depicts the shared file checkpointing system 400 of FIG. 2 configured for shared-file draining operations after the client application has written data to a BSCFS file and has resumed its normal computation workload. In FIG. 4, there is shown, each node's client process 120 issuing function calls to transfer checkpointing data files for storage at the parallel file system 75 through the bbServer process 130 at an I/O node (e.g., I/O node 0). Client 120 performs an optional fsync( ) system call and a close( ) system call 425 to begin the process of transferring the written BSCFS file to the PFS. The fsync( ) call guarantees that written data has reached the bscfsAgent process, but in a relaxation of POSIX® semantics, it does not guarantee that the data has been written to permanent storage.

After all client processes on a given compute node have written and closed a BSCFS file, the client application 120 initiates the draining operation by invoking a burst-buffer service call 415, e.g., BB_StartTransferShared( ). FIG. 4, as an example, shows the draining of the BSCFS file associated with SSD data file 182, partial block 276, and index 266. The start-transfer operation causes the bscfsAgent process 150 to append the partial block 276 of an open BSCFS file to the end 206 of the corresponding SSD data file, e.g., data file 182. Further, the operation causes bscfsAgent to pre-process the index and write the index as a separate file 216 in the SSD file system 180.

After finalizing the data file 182 and index file 216 in the SSD file system 180, the bscfsAgent process 150 communicates with the bbServer process 130 running on I/O node 0 (115A) to get the transfer started. The bbServer process 130 pulls the files, e.g., data file 182 and index file 216 from the compute node's SSD over a data path 440. In one embodiment, the bscfsHandler component (160 in FIG. 2) of the bbServer process 130 processes the data and index files and in effect replays the application's lseek( ) and write( ) operations, producing the large shared file 410 in the PFS 75 as the client application intended. For example, the transferred application data segments from data file 182 may be stored within the shared file 410 in the PFS at offsets provided by the index file 216, via data path 461.

In one embodiment, the bscfsHandler component 160 of the BBServer process 130 also produces an associated "map file" 450 that records the node that wrote each region of the shared file 410, for use when pre-staging the file back to the compute nodes. In one embodiment, the map file 450 is assembled as a concatenation of the index information from each of the compute nodes that contributed content to the shared file. In a different embodiment, the map file 450 may be built to include a first column having entries indicating the offsets into the shared file in which data segments were written, and a second column indicating the compute node that generated each segment. The first column of mapfile 450 may be formed from a corresponding entry in column 284 of the index 263 corresponding to a node that has written to the shared file in the PFS. In a further embodiment, the map file content may be stored as an extended file attribute in the shared file 410 rather than as a separate file.

FIG. 4 further depicts asynchronous draining of other compute nodes, e.g., Node 1, Node N-1, etc. All the I/O nodes may concurrently pull index and data files, each from a subset of the compute nodes. As an example, FIG. 4 shows bbServer 130 on I/O Node 0 (115A) processing index and data files 482 from Node 1 over data path 441 at the same time it is processing files from Node 0. And also at the same time I/O Node M-1 is processing index and data files 382 received from Node N-1 over data path 442, and using data path 471 to write the shared-file content into the PFS. All the bbServer processes can write to the shared file 410 concurrently, but they must coordinate to produce the associated map file 450. In one embodiment, the bbServer process at an I/O server node may hold a temporary lock such as a POSIX® file lock on the map file 450 while it updates the file with a compute node's indexing information.

Figure 5:
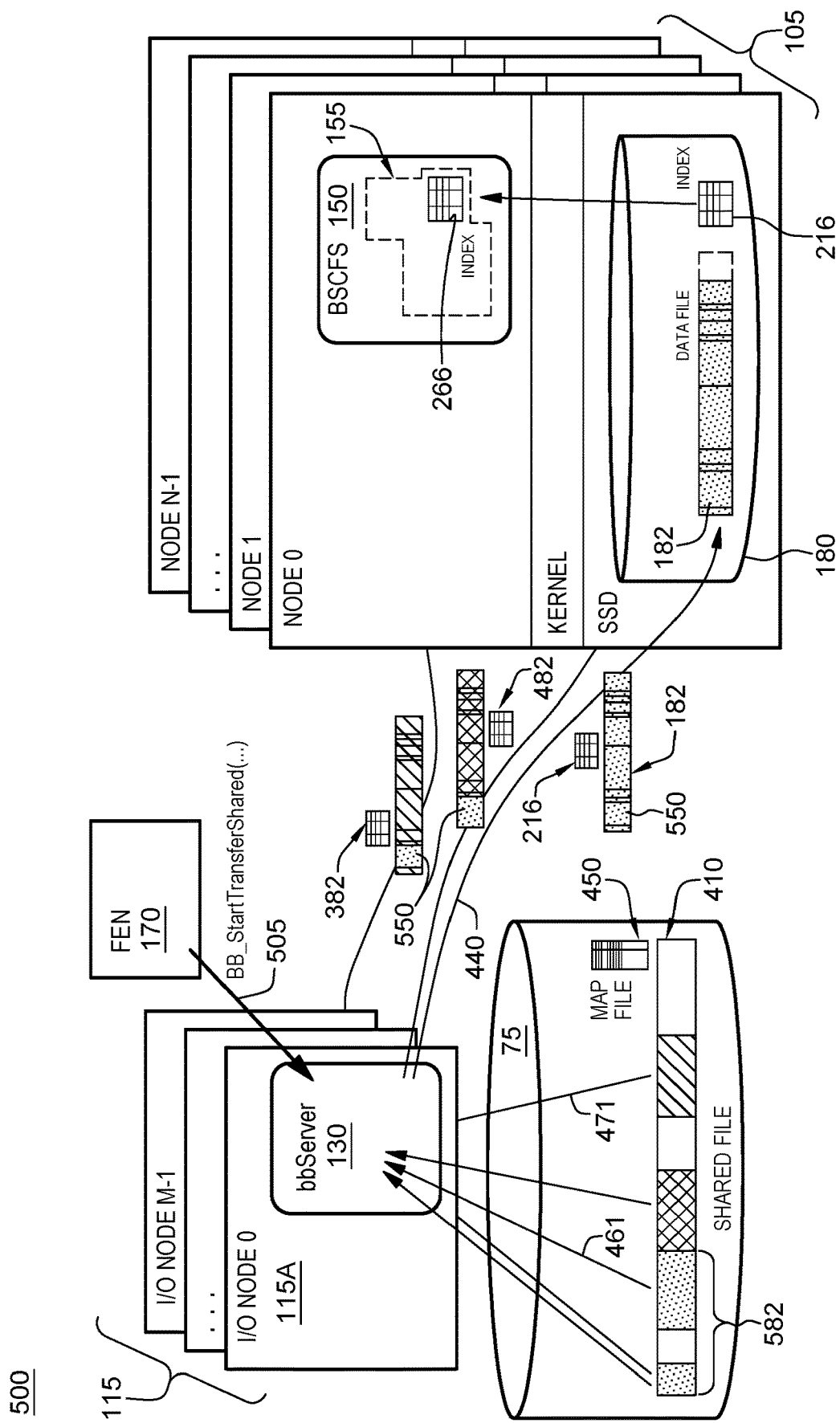
FIG. 5 depicts the system further performing a staging of a PFS file back into the local burst buffers memory at the compute node according to one embodiment.

FIG. 5 depicts the system 100 further performing a staging of a PFS file back into the local burst buffers memory at the compute node. When staging a PFS file into local burst buffers, the bscfsHandler component 160 (FIG.

2) of the bbServer process 130 on the I/O node takes as input a shared file 410 stored in the PFS and a map file 450 containing information regarding what sections of the shared file to send to which compute nodes' burst buffers so they can be made available for reading at the compute nodes. Map file 450 enables the bscfsHandler component to read and transfer the requested shared file sections to the targeted burst buffers of particular nodes. In one embodiment, the compute nodes may receive the relevant sections along with a corresponding index to use for future read operations at those nodes. The specified map file may be the map file that was created when the shared file was drained, it may be a modified version thereof, or it may be a completely new map file.

In view of FIG. 2, system 100 performs shared-file staging operations to enable nodes to read their data files stored in the PFS. In one embodiment, as shown in FIG. 5, a file staging operation is initiated by functionality at the front end node 170, e.g., bscfsStageIn component 174 (FIG. 2). This front end node component may issue a BB_Start-TransferShared command 505 to initiate a shared-file transfer, i.e., by providing the names of the shared file 410 and the map file 450 in the PFS that specifies how the shared-file content is to be distributed.

In one embodiment, the bscfsHandler component at the I/O node responds to the generated command 505 to pull data out of the shared file 410 and assemble a data file and an accompanying node-specific index file for each compute node it services, and pre-stage everything to the upcoming job's compute-node SSD file systems. In one embodiment, a particular byte range may be distributed to a specified node, to all nodes, or to no node. The bscfsAgent process reads the index into memory. In one example depicted in FIG. 5, the bscfsHandler component (not shown) at the I/O node obtains, via offset information from the map file 450, the portions 582 of shared file 410 destined for compute Node 0 and packages it as a contiguous data file 182 with the accompanying index file 216 stored at the PFS, or a modified version thereof. This data file 182 and accompanying index 216 are pushed over data path 440 for storage back into the SSD file system 180 at Node 0. In one embodiment, the bscfsAgent component 150 may then pull the index 216 from the SSD 180 back into local node memory 155 as index 266 so that the contents of data file 182 may be read at Node 0. The index file 216 may then be deleted from the SSD file system 180.

In one embodiment, the staging process may occur concurrently at multiple nodes. For example, the contiguous data file and accompanying index 482 formed at I/O Node 0 may be pushed over a data path for storage back into the local SSD memory at compute Node 1. Similarly, data file and corresponding index 382 formed at I/O Node M−1 may be pushed over a data path for storage back into the local SSD memory at the compute Node N−1.

In one embodiment, in FIG. 5, there is shown a first block 550 which is included in all the returned data files, e.g., data files 182, 382 and 482, as being sent back to their respective compute nodes. For example, the map file 450 may include the first block 550 which may be a header block containing header information for use by compute nodes and this header may be broadcast to all the compute nodes in a staging operation.

After staging the shared file back to the compute nodes, the compute node bscfsAgent processes are ready to handle read requests for the file contents.

Figure 6:
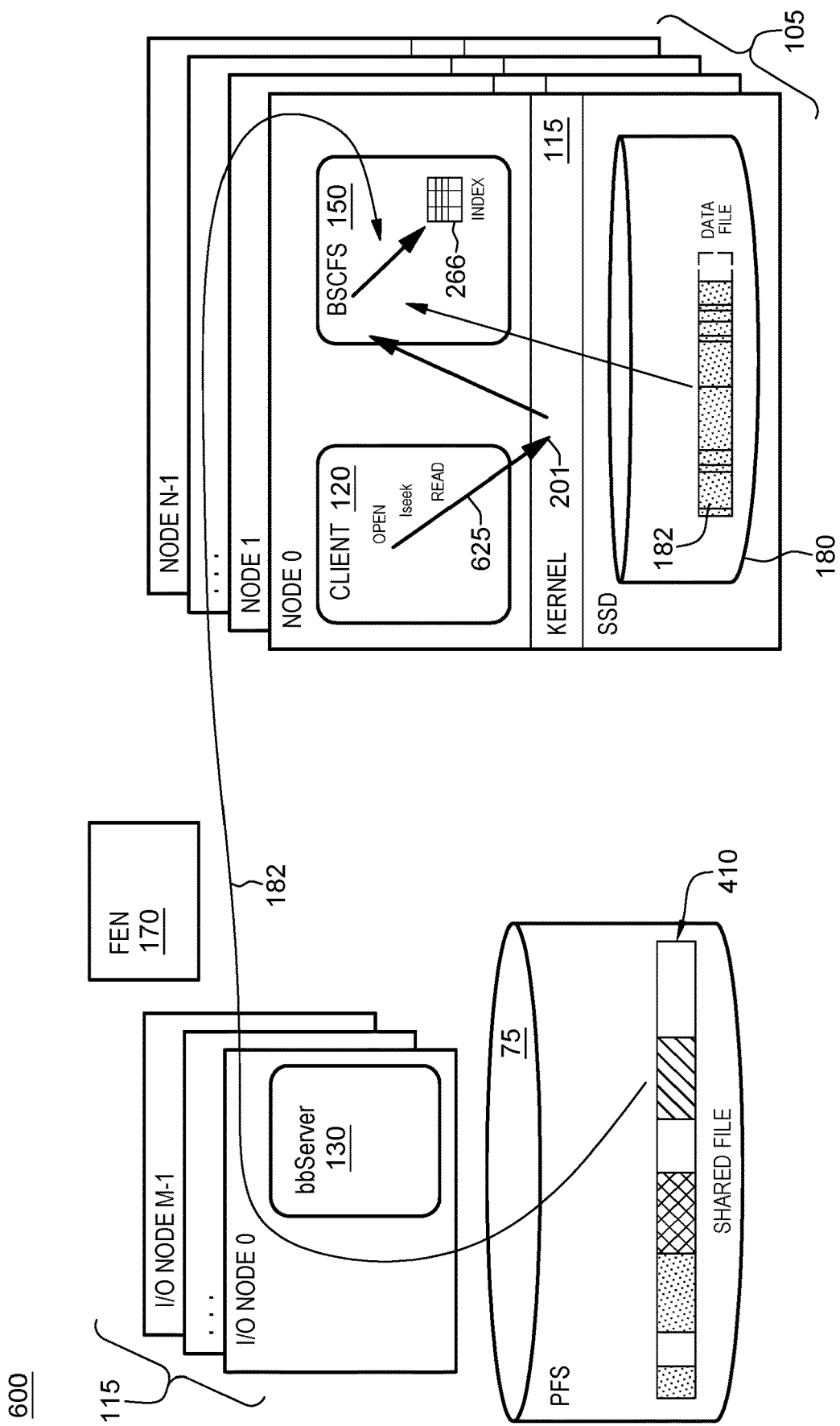
FIG. 6 shows the system of FIG. 2 performing shared-file reading operations according to one embodiment.

As further shown in FIG. 6, system 100 performs shared-file reading operations. That is, each node's client process 120 issues function calls 625 to read content from shared file 410 stored at the parallel file system. In one embodiment, client application 120 issues an open function call that opens the shared file 410 using its /bscfs/ . . . file name. Client 120 then performs a sequence of lseek( ) and read( ) calls 625, which are re-directed (201) by the kernel 115 back to the bscfsAgent process 150. As known, the read( ) operation takes in parameters such as a file descriptor (filename), the address of a buffer in which to place the data, and a count in bytes to be read, and attempts to read count bytes from the file into buffer. For each read( ) the bscfsAgent process 150 checks the index 266 to see if the content at the offset that the client wants to read is present in the local SSD partition, i.e., in data file 182. If the content has been staged to the local SSD, bscfsAgent 150 reads it directly from the SSD and returns it to the client. Otherwise, if the index 266 indicates that the requested content is not present in the local SSD, the bscfsAgent fetches the desired content directly from the requested offset in the real shared file 410, which is still resident in PFS storage device 75, and returns it to the client. The client will not know whether the read data came from the local SSD or was returned directly from the remote PFS system 75.

In one embodiment, reading from the PFS directly may be performed at rates on the order of 300 Mbytes/sec. The SSD can handle writing at 2 Gbytes/sec and reading at 6 Gbytes/sec. Thus, the reading operations are an order of magnitude faster reading from the local SSD rather than reading directly from the shared file.

Figure 7A:
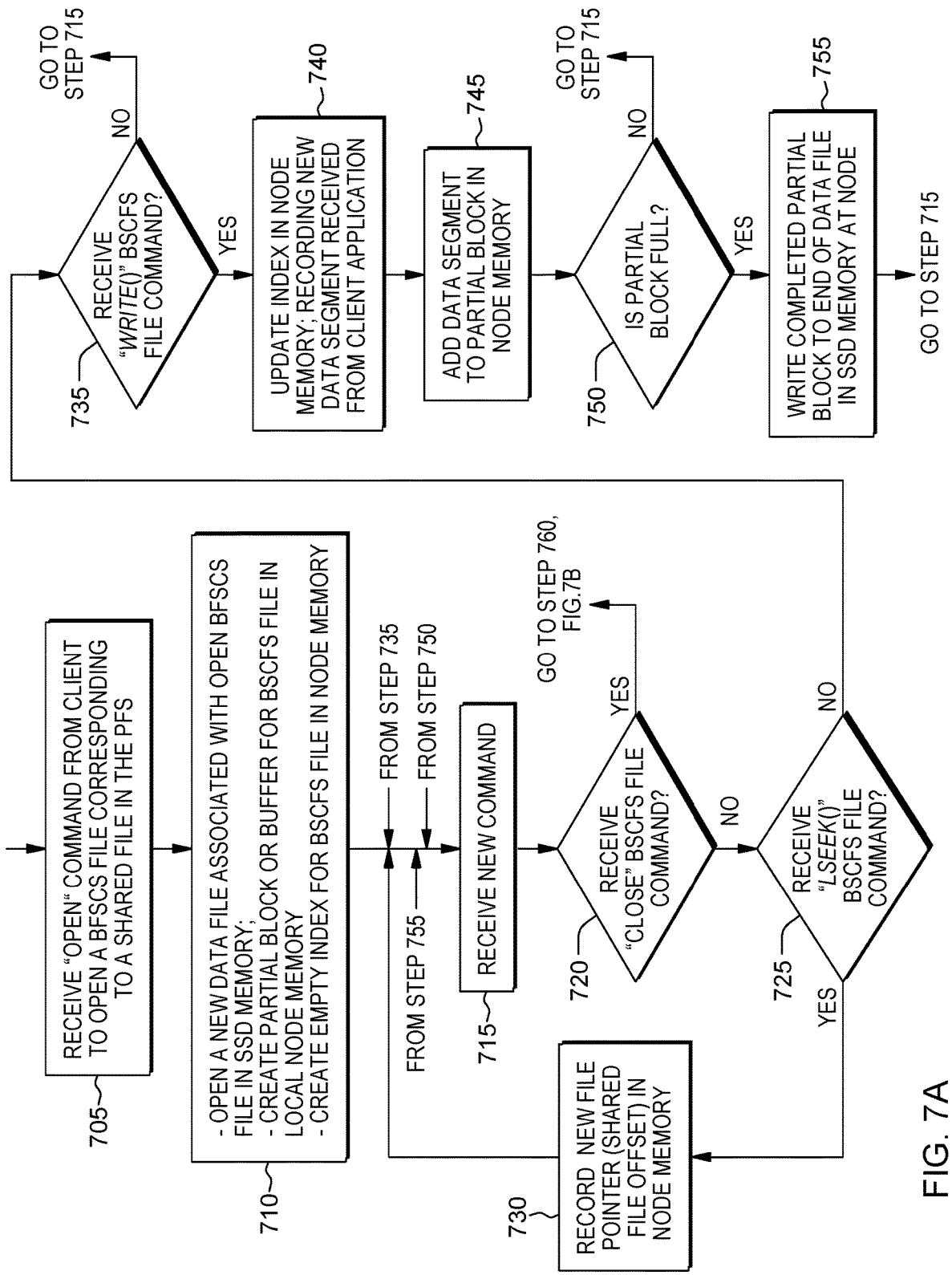
FIGS. 7A-7B show an embodiment of a shared-file writing method performed by the bscfsAgent process running at each of the compute nodes according to an embodiment.
Figure 7B:
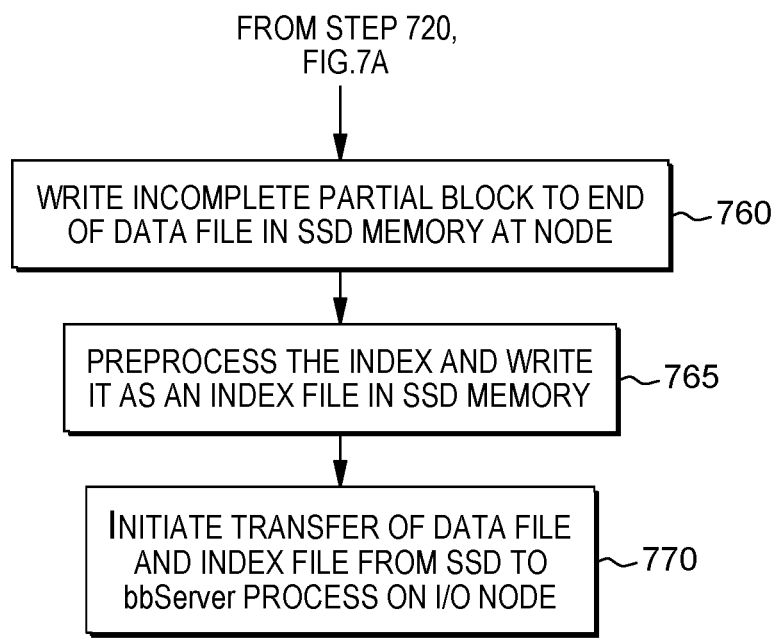

FIGS. 7A-7B shows an embodiment of a shared-file writing method 700 performed by the bscfsAgent process 150 running at each of the compute nodes 105. In particular, for a writing process, step the 705 represents the step of receiving an intercepted signal requesting to open a file such that an application process may write data for eventual storage in a shared file. At 710, responsive to the receipt of an open( ) command, the bscfsAgent opens a data file in a local SSD file system at the node. The bscfsAgent additionally creates a partial block, or buffer, and an empty index in local node memory. Then the bscfsAgent receives at 715 a new command intercepted from the kernel. A determination is made as to whether the received command is a close( ) bscfs file operation. If the received command is a close( ) file operation, the process proceeds to step 760, FIG. 7B to close the created SSD file as explained in greater detail below. If the received command is not a close( ) operation, this indicates that the application is writing checkpointing data to the local checkpointing file. The process proceeds to 725 where a determination is made as to whether the received command is an lseek( ) operation issued by the client application. If the received command is an lseek( ) operation, then the process proceeds to 730, where the bscfsAgent records the shared file pointer (i.e., an offset value with reference to a beginning location of the shared file) in local node memory, to be used in a subsequent write operation. The process then returns back to 715 to await new commands issued by the application. If, at 725, it is determined that the received command is not an lseek( ) operation, then the process proceeds to 730, where it is determined whether the received command is a write( ) operation. If the received command is not a write operation, then the requested operation was not relevant to this method, and the process returns to 715 to wait for a new command. At 735, if the received command is a write operation, the bscfsAgent process at 740, updates the associated index in the bscfs memory for tracking the new data segment received from the client application, and the bscfsAgent process at 745 writes the new data segment to the created partial block buffer. Then, as written segments are accumulated in the in-memory partial block, at 750, the bsfcsAgent process determines whether the partial block is full, i.e., completely written with file data. If the partial block is not full, then system returns to 715 where the bsfcsAgent process awaits receipt of the next command, e.g., continue accepting file data written by the client. If, at 750, it is determined that the partial block is full, then at 755, the bsfcsAgent process writes the full, contiguous block to the corresponding data file in the SSD file system at the node.

With respect to step 740, the bscfsAgent process will add an entry, or modify an existing entry, in the index to account for the newly-written segment. The segment is characterized by its shared-file offset (taken from the file pointer that bscfsAgent is tracking), its data file offset (which is calculated as the sum of current size of the data file and the offset within the in-memory partial block at which the segment will be stored), and the segment size (which is a parameter of the write system call).

Returning to 720, if the bscfsAgent determines the client has issued a system call to close the checkpointing file, the process proceeds to a further processing step 760 in FIG. 7B.

At 760, FIG. 7B, in response to the close( ) operation issued by the application, the bscfsAgent process, performs a flushing of the partial block in local node memory to the corresponding SSD data file, and once completed, at 765, the bscfsAgent preprocesses the index data and writes the corresponding index to the SSD file system as a separate index file. Then at 770, a burst-buffer service starts transferring the SSD data file and the SSD index file to a bbServer process at an I/O Node for storage in the shared file in the PFS.

Figure 8:
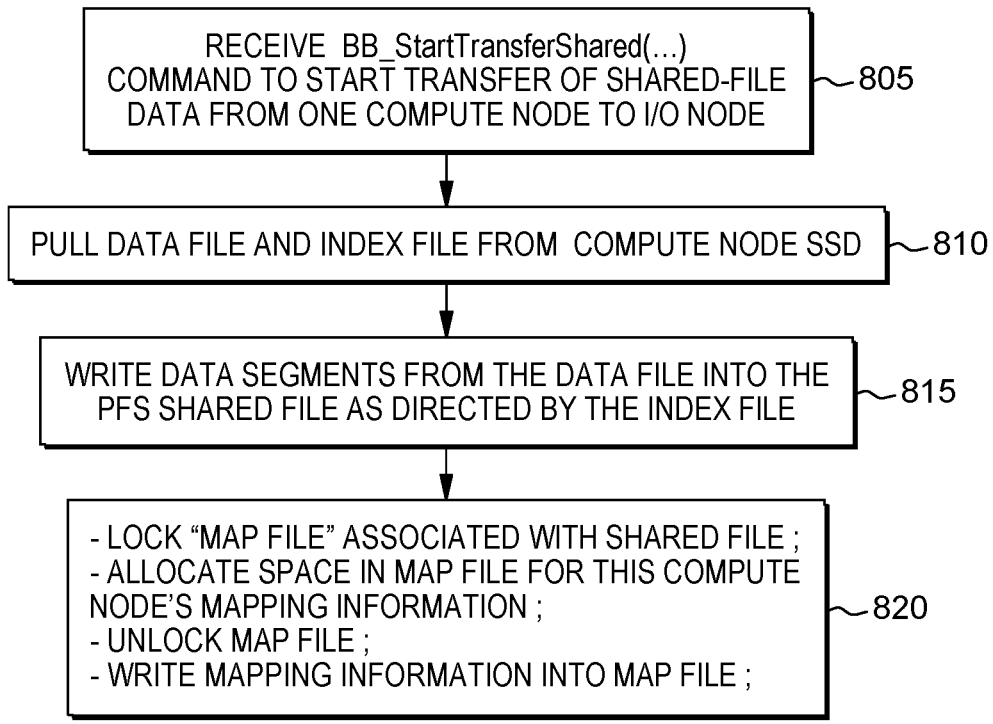
FIG. 8 shows a bbserver and bscfsHandler processes for the shared-file draining method performed at the I/O Node according to embodiments herein.

FIG. 8 shows an embodiment of a shared-file draining (stage-out) method 800 performed at the I/O Node. In FIG. 2 bscfsHandler 160 was shown as a component of the bbServer process 130. The method shown in FIG. 8 is executed cooperatively by the bbServer process and its bscfsHandler component. At 805, FIG. 8, the bbServer/bscfsHandler receives a BB_StartTransferShared( . . . ) command from the client application to initiate the transfer of the file content from the SSD burst buffer at a compute node to a shared file stored in the PFS. Responsive to the command, at 810 bbServer/bscfsHandler pulls the data file and associated index file from the compute-node SSD. Specifically, for transferring to the shared file, at 815, FIG. 8, bbServer/bscfsHandler copies data segments from the received data file into the PFS shared file at locations specified by the received index file. In this manner, the system uses on the PFS side the information contained in the index, and the data files, to build the shared file in the PFS. Each node may write simultaneously to the shared file. After being built in such way, the shared file has the same format as if it had been written by the compute node directly, and can be treated similarly as other files.

Then, at 820, FIG. 8, bbServer/bscfsHandler generates a "map file" to accompany the shared file. The map file identifies the node that wrote each section of the global shared file at the PFS. This generated map file contains a subset of the information found in the index files received from the compute nodes. The data-file offset information in the index files is not needed once the data files have been incorporated into the PFS shared file. Afterwards, the file-draining method ends. In one embodiment, the bbserver/bscfsHandler combination at the I/O node waits for a further command, such as a staging command to provide the data file and an accompanying index back to the compute node.

Figure 9:
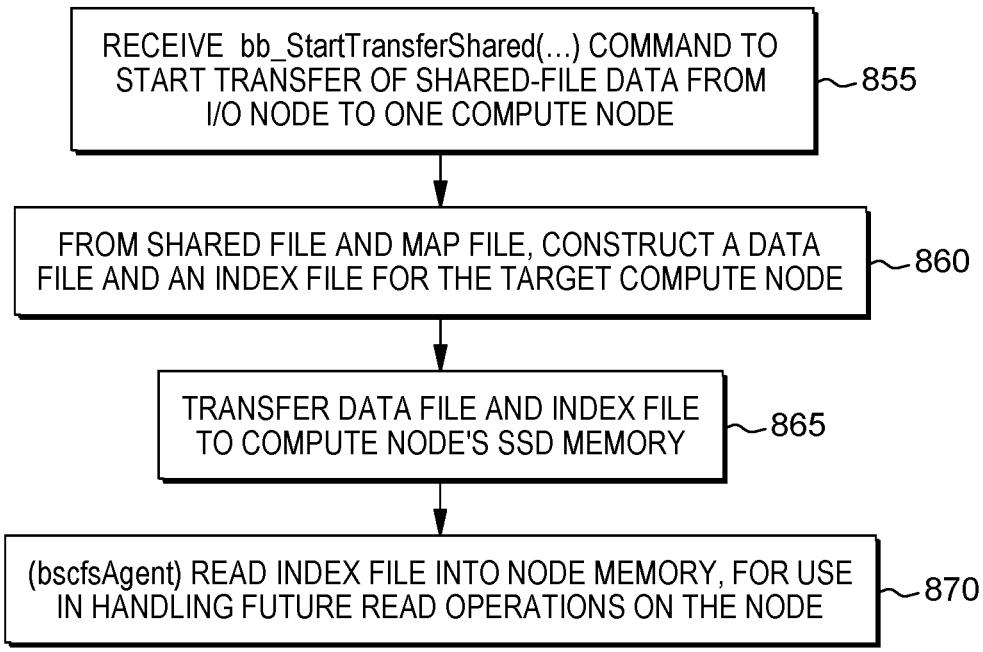
FIG. 9 shows the bbserver and bscfsHandler processes for performing a shared file staging operation at the I/O Node according to an embodiment.

FIG. 9 shows the bbServer/bscfsHandler method 850 for performing a shared file staging operation at the I/O Node according to an embodiment. In particular, at 855, FIG. 9, bbServer/bscfsHandler receives a BB_StartTransferShared( . . . ) command from a script running at the front end node to initiate a shared-file transfer to a compute node. At 860, responsive to receipt of the command, the bbServer/bscfsHandler reads the specified map file and constructs a node-specific data file and a corresponding index file for the target compute node. Then, at 865, the process transfers the node-specific data and index files to the targeted SSD burst buffer memory at the identified compute node. Then, at 870, the bscfsAgent process on the compute nodes reads the index file from the node SSD file system into local node memory, for use in handling future read operations at that node.

Figure 10:
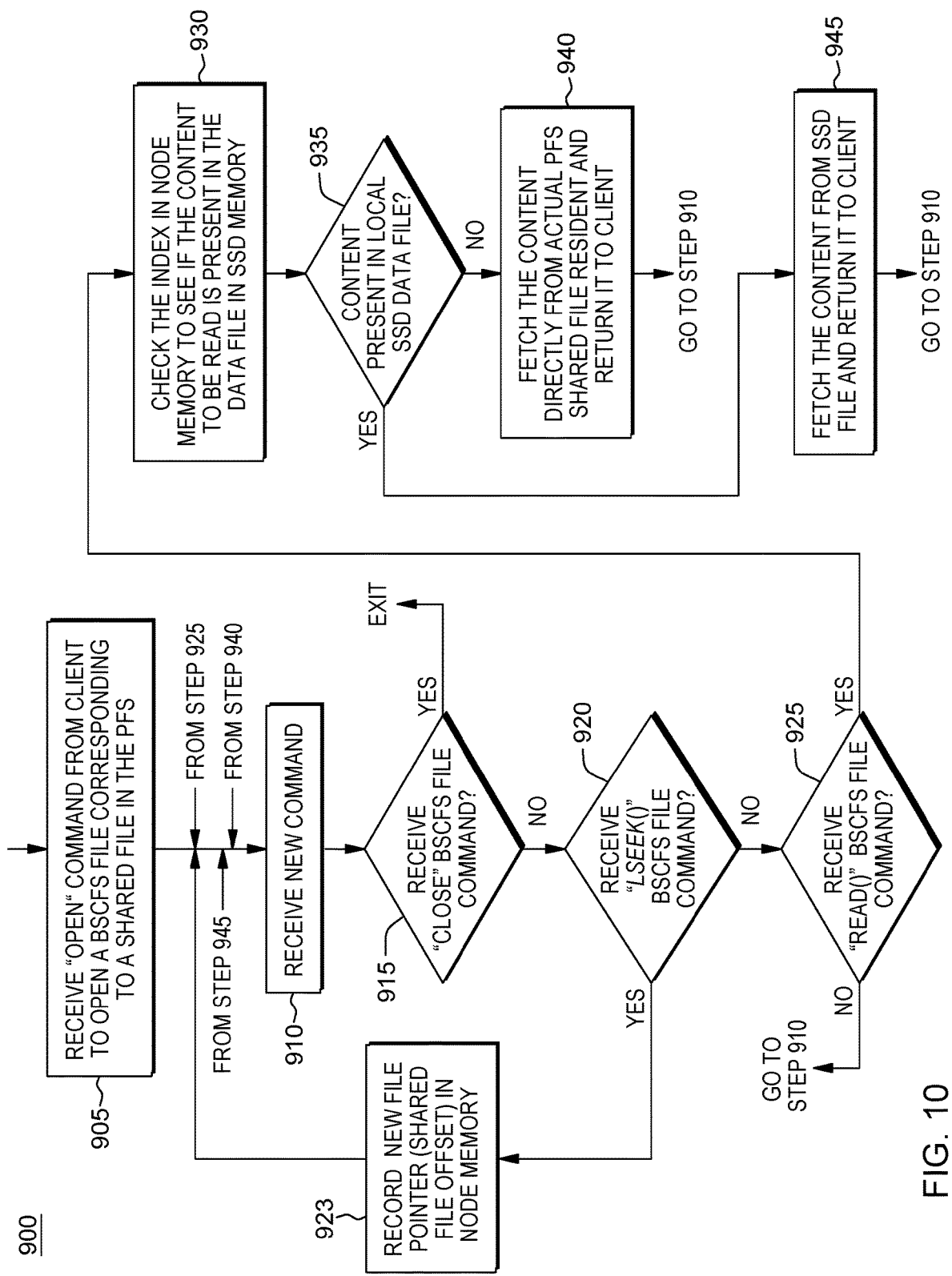
FIG. 10 depicts a shared-file reading method performed by the bscfsAgent process running at each of the compute nodes in one embodiment.

FIG. 10 depicts a shared-file reading method 900 performed by the bscfsAgent process 150 running at each of the compute nodes 105. In particular, for a reading process, step 905 represents the step of receiving an intercepted signal from the kernel requesting to open a targeted shared file such that an application process may read data from it. Then the bscfsAgent receives at 910 a new command intercepted from the kernel. At 915, a determination is made as to whether the received command is a close( ) bscfs file operation. If the received command is a close( ) file operation, the method terminates and exits. Otherwise, at step 915, FIG. 7B if the received command is not a close( ) operation, then at 920, the bscfsAgent determines whether the received command was an lseek( ) operation. If the received command was an lseek( ) operation, then the process proceeds to 923, where the bscfsAgent records the shared file pointer (i.e., an offset value with reference to a beginning location of the shared file) in local node memory, to be used in a subsequent read, and the process returns to 915 to determine the next command signal received from the client application. If at 920, the received command is not an lseek( ) operation, then at 925 the bscfsAgent determines whether the command is a read( ) operation. If the received command is not a read operation, then the requested operation was not relevant to this method, and the process returns to 915 to wait for a new command. Responsive to receipt of the read( ), at 930, the bscfsAgent process may then check the locally stored index to see if the content to be read is present in the local SSD data file. At 935, a determination is made as to whether the content is present in the local burst buffer SSD memory. If the content is not present in the local SSD data file, the process proceeds to 940 where the bscfsAgent process fetches the desired content directly from the real shared file, which is still resident in the PFS, and returns the desired content to the client and returns to 910. Otherwise, at 945, the content is read from the SSD data file. BscfsAgent returns the content to the client and returns to 910.

In one embodiment, aspects of reading and writing to the shared file are independent and are not necessarily tied together. For example, an alternate embodiment may include the functionality to use part of bscfs to move a shared file to the PFS, without the staging operation for moving it back into the node's burst buffer. Similarly, it is possible to create a shared file in the PFS through traditional means and move it into the burst buffer according to the staging method herein.

In one embodiment, it is not required that the bscfs' intermediate data (index and data) be implemented as files. It could be performed via a block device (sans local file system), or Remote Direct Memory Access from memory.

As long as the index and data information is obtainable by the bbServer process 130 through some mechanism, e.g., files. However, non-limiting embodiments may include non-volatile RAM technologies that are more efficiently implemented via load/store operations rather than file system operations.

While the present invention is described herein with respect to checkpointing of application data in a shared file system, the invention is in no way limited to just this use case. Rather, the present system and methods are applicable to any usage of a shared file in which processes primarily read and write disjoint regions of the file, and there is a desire to accelerate access to the file using a distributed burst buffer.

Figure 11:
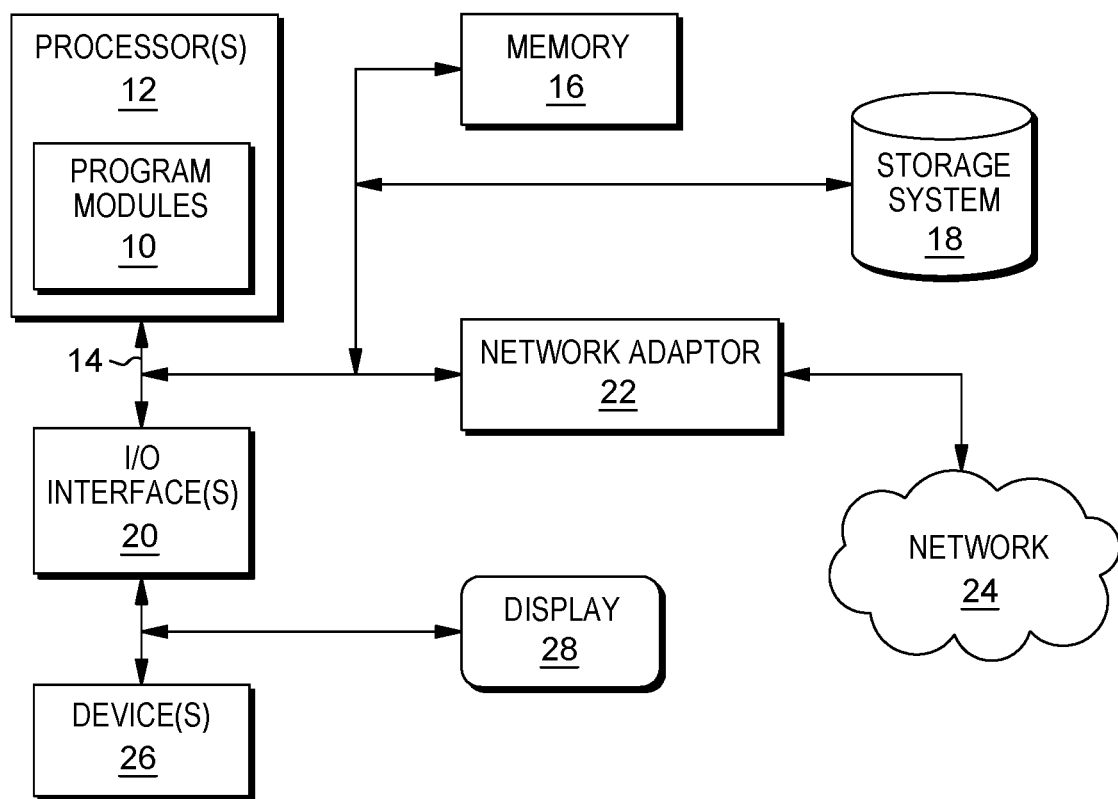
FIG. 11 illustrates an example computing system in accordance with the present invention.

FIG. 11 illustrates an example computing system in accordance with the present invention. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 11 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the present system and methods (see e.g., FIGS. 2-10).

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory and/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for managing storage of data comprising:
a plurality of compute nodes of a computing system, each node running a client application that generates application data for storage to a shared file stored in a shared parallel file system (PFS); each compute node further comprising a local burst buffer memory storage device physically incorporated in the compute node, the local burst buffer memory storage device accessible through compute node operating system operations for asynchronously copying files to the PFS;

each compute node including a processor and a local associated memory for storing data and instructions, said processor running said instructions to configure said processor, independently of other compute nodes, to:

respond to write operations issued by said running client application by storing segments of application data to said local associated memory, said storing segments of said application data comprising aggregating said storing segments in a pre-determined sized memory block in said local associated memory;

open a single data file corresponding to the running application in the burst memory storage device local to the compute node;

store said written segments of application data from said local associated memory to the single file in the burst memory storage device, said processor further configured to:

detect when a pre-determined sized memory block of aggregated written application data is full and then store the full memory block size of said aggregated written application data to said single data file;

build an associated index for said single file comprising data specifying locations within said shared file for storing said segments of application data written to said single data file, said data specifying locations within said shared file comprising offset values relative to a reference location in said shared file where segments of written application data are to be stored at said PFS;

asynchronously transfer said single data file and said associated index from said burst memory storage device at the compute node to the PFS for storage thereat, and responsive to the information in the data file and associated index, said parallel file system generating said shared file in the PFS by replaying said application write operations to create the segments of written application data for storage in said shared file at locations corresponding to said offset values and storing segments of application data from said single data file to said shared file in said PFS in a manner as originally written by said client application at the compute node, wherein the shared file has a same format as expected by said compute node for similar handling as other files, and generate and store in said PFS a mapping file, said mapping file having entries for indicating the offsets into the shared file in which segments of application data were written and the respective associated compute node that generated the written application data for use in mapping each segment of written application data stored in the shared file in said PFS with their corresponding compute node's incorporated burst memory storage device that transferred said stored segment.

2. The system as claimed in claim 1, said system further comprising:

a plurality of I/O nodes each for interfacing directly with said PFS, each I/O node having a processor running instructions configuring it to:

receive said transferred single data file containing written segments of application data and said associated index for storage at said PFS.

3. The system as claimed in claim 2, wherein said processor at each compute node is further configured to:

record offset values from a reference location in said single data file where said segments of written application data are stored in the single data file;

said associated index further comprising:

said recorded offset values corresponding to locations in said single data file where said segments of application data are written, and sizes of segments of said written application data stored in said single data file.

4. The system as claimed in claim 3, wherein each processor at an I/O node runs instructions further configuring it to:

receive a command to stage a transfer of a plurality of segments of said shared file to a burst memory storage device at one or more compute nodes;

assemble, responsive to said received command, a package comprising said segments stored at said offset locations indicated by said mapping file and an associated index characterizing said segments;

push said package back to said one or more compute nodes for storage at an associated local burst memory storage device; and transfer said associated index from said local burst memory storage device back to said associated memory of said compute node.

5. The system as claimed in claim 4, wherein said generated mapping file comprises: indication of a first header block containing header information for use by plural compute nodes, said first header block being broadcast to all the compute nodes in a respective said package.

6. The system as claimed in claim 4, wherein said processor at each compute node is further configured to:

responsive to a read operation issued by said running application to read a desired written application data content stored in said shared file, determine, from the associated index, whether the requested written application data content to be read is present in the local burst memory storage device; and if it is determined that the desired content to be read is present in the local burst memory storage device, then read the requested content from the local burst memory storage device and return the desired content to the running application; otherwise if it is determined that the desired content to be read is not present in the local burst memory storage device, then fetch the desired content directly from the shared file stored in the PFS, and then return the desired content to the running application.

7. A method for managing storage of data in a system comprising a plurality of compute nodes, each node independently running a client application that generates application data for storage to a shared file stored in a shared parallel file system (PFS); each compute node further comprising a local burst memory storage device physically incorporated in the compute node, the local burst buffer memory storage device accessible through compute node operating system operations for asynchronously copying files to the PFS, wherein at each compute node, said method comprising independently of other compute nodes:

storing segments of application data, by a hardware processor, in response to write operations issued by said running client application, to a local memory associated with said hardware processor, said storing segments of said application data comprising aggregating said storing segments in a pre-determined sized memory block in said local associated memory;

opening, by said hardware processor, a single data file corresponding to the running application in the burst memory storage device local to the compute node;

storing, by said hardware processor, said segments of written application data from said associated memory to the single file in the burst memory storage device, said burst memory storage device accessible through operating system operations, said storing said segments comprising:

detecting when a pre-determined sized memory block of aggregated written application data is full, and storing the full memory block size of said aggregated written application data to said single data file;

building, by said hardware processor, an associated index for said single file comprising data specifying locations within said shared file for storing said segments of application data written to said single data file, said data specifying locations within said shared file comprising offset values relative to a reference location in said shared file where segments of written application data are to be stored at said PFS;

asynchronously transferring said single data file and said associated index from said burst memory storage device at the compute node to the PFS for storage thereat, and responsive to the information in the data file and associated index, said parallel file system generating said shared file in the PFS by replaying said application write operations to create the segments of written application data for storage in said shared file at locations corresponding to said offset values and storing said segments of application data from said single data file to said shared file in said PFS in a manner as originally written by said client application at the compute node, wherein the shared file has a same format as expected by said compute node for similar handling as other files, and generate and store in said PFS a mapping file, said mapping file having entries for indicating the offsets into the shared file in which segments of application data were written and the respective associated compute node that generated the written application data for use in mapping each segment of written application data stored in the shared file in said PFS with their corresponding compute node's incorporated burst memory storage device that transferred said stored segment.

8. The method as claimed in claim 7, said system further comprising:
a plurality of I/O nodes each for interfacing directly with said PFS, each I/O node having an associated processor configured to perform a method comprising:
receiving, at the associated processor, a transferred single data file containing segments of written application data and said associated index for storage at said PFS.

9. The method as claimed in claim 8, further comprising, at each compute node:
recording, by said hardware processor, offset values from a reference location in said single data file where said segments of written application data are stored in the single data file;
said associated index further comprising:
said recorded offset values corresponding to locations in said single data file where said segments of application data are written, and sizes of said segments of written application data stored in said single data file.

10. The method as claimed in claim 8, further comprising:
receiving, by said associated processor at an I/O node, a command to stage a transfer of a plurality of segments of said shared file to a burst memory storage device at one or more compute nodes;
assembling, by said associated processor at said I/O node, responsive to said received command, a package comprising said segments stored at said offset locations indicated by said map file and an associated index characterizing said segments;
pushing, by said associated processor at said I/O node, said package back to said one or more compute nodes for storage at an associated local burst memory storage device; and
transferring, by said hardware processor at said one or more compute nodes, said associated index from said local burst memory storage device back to said associated memory of said compute node.

11. The method as claimed in claim 10, further comprising:
receiving, by said hardware processor of a compute node, a read operation issued by said running application requesting to read a desired written application data content stored in said shared file;
determining, by said hardware processor, from the associated index, whether the requested written application data content to be read is present in the local burst memory storage device; and
if it is determined that the desired content to be read is present in the local burst memory storage device, then
reading, by said hardware processor, the requested content from the local burst memory storage device and returning the desired content to the running application; otherwise if it is determined that the desired content to be read is not present in the local burst memory storage device, then
fetching, by said hardware processor, the desired content directly from the shared file stored in the PFS, and then returning the desired content to the running application.

12. A system for managing storage of data in a shared parallel file system (PFS), said system comprising:
a plurality of I/O nodes each for interfacing directly with said PFS and computing nodes running a client application, said compute nodes configured, independently of other compute nodes, to store application data written by the running client application to a shared file stored in said PFS, each said compute nodes having an associated local memory for storing and aggregating segments of said written application data in pre-determined sized memory blocks in said compute node, each said compute node detecting when a pre-determined sized memory block of aggregated written application data is full and then storing the full memory block size of said aggregated written application data to an associated local burst memory storage device physically incorporated in the compute node, said burst memory storage device accessible through compute node operating system operations for asynchronously copying files to the PFS; each I/O node having a processor and a local associated memory storing data and instructions, said instructions configuring said processor to:
receive asynchronously transferred segments of written application data from the associated local burst memory storage device for storage in a shared file at said PFS; and
receive an index associated with said transferred segments of written application data, said index comprising data specifying locations within said shared file for storing said transferred segments, said data specifying locations within said shared file comprising offset values relative to a reference location in said shared file where segments of written application data are to be stored at said PFS;

store the segments of written application data into said shared file in the PFS by replaying said application write operations to create the segments of written application data for storage in said shared file at locations corresponding to said offset values in a manner as originally written by said client application at the compute node, wherein the shared file has a same format as expected by said compute node for similar handling as other files;

generate and store in said PFS a mapping file, said mapping file having entries for indicating the offsets into the shared file in which segments of application data were written and the respective associated compute node that generated the written application data for use in mapping each segment of written application data stored in the shared file in said PFS with their corresponding compute node's incorporated burst memory storage device that transferred said stored segment;

receive a command to stage a transfer of a plurality of segments of said shared file to a burst memory storage device associated with one or more compute nodes for reading thereat;

assemble, using the mapping file, responsive to said received command, a package comprising said segments stored and an associated index characterizing said segments;

push said package back to said one or more compute nodes for storage at the associated local burst memory storage device.

13. The system as claimed in claim 12, wherein each processor at an I/O node runs instructions further configuring it to:
receive said segments of written application data and said associated index for storage in said shared file at said PFS.

14. The system as claimed in claim 12, wherein said associated index further comprises:
offset values relative to a reference location in a single data file corresponding to locations in said single data file recorded by said processor at a compute node where said segments of application data were written to the single data file stored in said local burst memory storage device, and
sizes of said segments of written application data stored in said single data file.

15. The system as claimed in claim 14, wherein each said processor at each said compute node is further configured to:
transfer said associated index from said local burst memory storage device back to a memory associated with processor at said compute node; and
responsive to a read operation issued by said running application to read a desired written application data content stored in said shared file,
determine, from the associated index, whether the requested written application data content to be read is present in the local burst memory storage device; and
if it is determined that the desired content to be read is present in the local burst memory storage device, then read the requested content from the local burst memory storage device and return the desired content to the running application; otherwise if it is determined that the desired content to be read is not present in the local burst memory storage device, then
fetch the desired content directly from the shared file stored in the PFS, and then return the desired content to the running application.

* * * * *